(12) United States Patent
Osborne

(10) Patent No.: US 6,290,594 B1
(45) Date of Patent: Sep. 18, 2001

(54) SYSTEM AND METHOD FOR VENTILATING HYDROGEN GAS FROM A VEHICLE

(75) Inventor: Kurt David Osborne, Dearborn, MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/638,994

(22) Filed: Aug. 16, 2000

(51) Int. Cl.[7] .................................................. B60H 27/00
(52) U.S. Cl. .............................................. 454/75; 454/162
(58) Field of Search ................................ 237/12.5, 9 A; 454/162, 75, 143

(56) References Cited

U.S. PATENT DOCUMENTS

| | | | |
|---|---|---|---|
| 4,638,443 | * | 1/1987 | Kaneyasu et al. .................. 364/497 |
| 5,074,137 | * | 12/1991 | Harris et al. ........................ 73/31.02 |
| 5,132,663 | * | 7/1992 | Strobl et al. ........................ 340/438 |
| 5,644,069 | * | 7/1997 | Liu et al. ............................. 73/23.2 |
| 5,720,181 | * | 2/1998 | Karl et al. ............................ 62/180 |
| 5,954,577 | * | 9/1999 | Meckler ................................ 454/75 |

* cited by examiner

Primary Examiner—Harold Joyce
Assistant Examiner—Derek S. Boles
(74) Attorney, Agent, or Firm—Ford Global Tech., Inc.

(57) ABSTRACT

A system 10 is provided for ventilating hydrogen gas from a vehicle 12 which includes one or more fuel cells 14. System 10 includes a control module or controller 16, vehicle sensors 20, several fans 22, and several hydrogen gas sensors 18 which are operatively and communicatively coupled to a hydrogen gas detection module 26. Hydrogen gas detection module 26, sensors 20 and fans 22 are each communicatively connected to controller 16. Controller 16 is effective to selectively and periodically activate fans 22 in response to signals received from module 26 (e.g., sensors 18) and sensors 20, thereby substantially preventing hydrogen gas from pocketing or collecting in areas of vehicle 12.

11 Claims, 2 Drawing Sheets

SYSTEM AND METHOD FOR VENTILATING HYDROGEN GAS FROM A VEHICLE

FIELD OF THE INVENTION

This invention relates to a system and method for ventilating hydrogen gas from a vehicle and more particularly, to a system and method for use within a fuel cell-powered vehicle and which includes a plurality of ventilation fans that are selectively and periodically activated based upon several input signals, thereby substantially preventing hydrogen gas from pocketing or collecting in portions of the vehicle.

BACKGROUND OF THE INVENTION

In order to reduce automotive emissions and the demand for fossil fuel, automotive vehicles have been designed which are powered by electrical devices such as fuel cells. These fuel cell-powered electric vehicles reduce emissions and the demand for conventional fossil fuels by eliminating the internal combustion engine (e.g., in completely electric vehicles) or operating the engine at only its most efficient/preferred operating points (e.g., in hybrid electric vehicles). However, while fuel cell-powered vehicles have reduced harmful vehicular emissions, they present other drawbacks.

For example and without limitation, many fuel cells generate and/or consume hydrogen gas (e.g., as a reaction by-product or constituent). The generated and/or consumed hydrogen must be properly stored, transferred, removed and/or treated in order to prevent the hydrogen gas from escaping into other portions of the vehicle. Vehicles employing these types of fuel cells often include systems and/or assemblies for controlling hydrogen gas. However, since hydrogen is a relatively highly diffusive gas, these prior hydrogen gas control systems may "leak" or release hydrogen gas into portions of the vehicle, especially during certain conditions, such as during vehicle refueling or operation. This escaped hydrogen may undesirably "pocket" or collect in areas of the vehicle such as portions of the vehicle body, trunk, hood or passenger compartment.

There is therefore a need for a new and improved system and method for ventilating hydrogen gas from a vehicle which substantially prevents the hydrogen gas from pocketing or collecting in portions of the vehicle.

SUMMARY OF THE INVENTION

It is a first object of the invention to provide a system and method for ventilating hydrogen gas from a vehicle which overcomes at least some of the previously delineated drawbacks of prior systems, assemblies and methodologies.

It is a second object of the invention to provide a system and method for detecting the presence of hydrogen gas within certain areas of a fuel cell-powered vehicle and for activating several ventilation fans in response to such a detection.

It is a third object of the invention to provide a system and method for selectively and periodically activating several ventilation fans within a vehicle including a hydrogen-based fuel cell, effective to substantially prevent the pocketing or collection of hydrogen gas in portions of the vehicle.

According to a first aspect of the present invention, a system is provided for ventilating gas from a vehicle. The system includes at least one first sensor which is effective to detect the gas and to generate a first signal in response to the detection; at least one fan which is operatively disposed within the vehicle; and a controller which is communicatively coupled to the at least one first sensor, the controller being effective to receive the first signal and to selectively activate the at least one fan for a predetermined period of time upon receipt of the first signal, thereby ventilating the gas from the vehicle.

According to a second aspect of the present invention, a method is provided for ventilating gas from a vehicle. The method includes the steps of providing a plurality of fans; operatively disposing the plurality of fans within the vehicle; detecting an amount of the gas within the vehicle; and activating the plurality of fans for a predetermined period of time in response to the detected amount of gas, thereby ventilating the gas from the vehicle.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
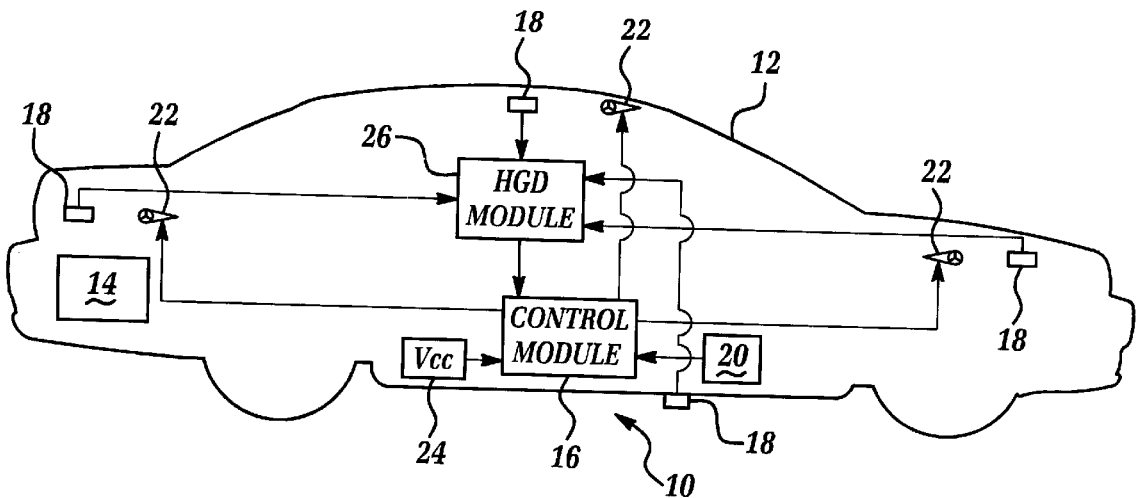
FIG. 1 is a schematic view of a system, which is made in accordance with the teachings of the preferred embodiment of the invention and which is effective to ventilate hydrogen gas from a vehicle of the type including a hydrogen-based fuel cell.
Figure 2:
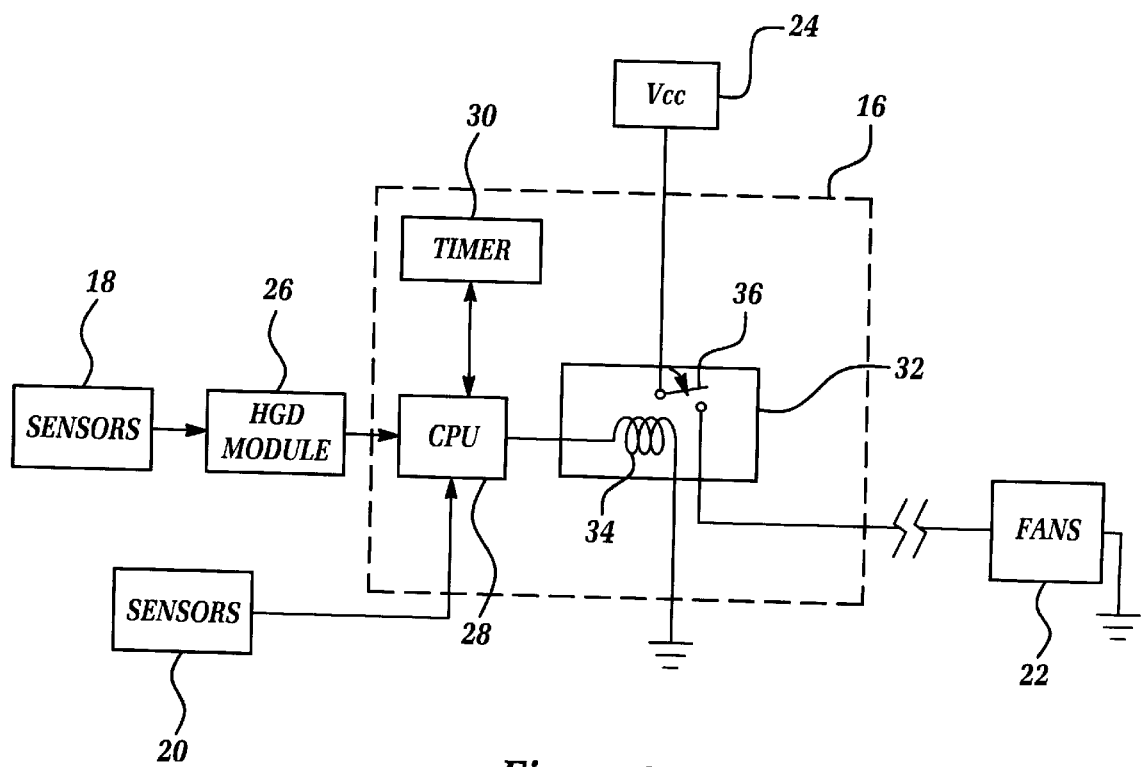
FIG. 2 is a block diagram of the system shown in FIG. 1.

Referring now to FIGS. 1 and 2, there is shown a system 10, which is made in accordance with the teachings of the preferred embodiment of the invention, and which is effective to ventilate hydrogen gas from a vehicle 12. System 10 is adapted for use in combination with a vehicle 12 including one or more fuel cells 14 which provide power to the vehicle 12. In the preferred embodiment, vehicle 12 is an electric or hybrid-electric vehicle. Fuel cells 14 are of the type which consume and/or generate hydrogen gas. That is, fuel cells 14 either utilize a chemical reaction that consumes hydrogen gas to generate electrical power, or produce hydrogen gas as a by-product of a power-generating chemical reaction. Vehicle 12 includes a conventional hydrogen gas channeling or conduit system (not shown) which is effective to store, treat and/or transfer the generated or consumed hydrogen gas. The system may include one or more storage containers and several tubes or conduits disposed throughout the vehicle, which selectively carry, transport, and/or store the hydrogen gas. Moreover, while the following discussion concerns the ventilation of hydrogen gas from a vehicle, it should be appreciated that system 10 can be used to ventilate other undesired gas or matter from a vehicle.

In the preferred embodiment, system 10 includes a control module or controller 16, vehicle sensors 20, several fans 22, and several hydrogen gas sensors 18 which are operatively and communicatively coupled to a hydrogen gas detection module 26. Hydrogen gas detection module 26, sensors 20 and fans 22 are each communicatively connected to controller 16. Controller 16 is operatively connected to and receives electrical power from a conventional power supply 24.

In the preferred embodiment, controller 16 comprises a central processing unit 28, a timer 30, and an electronic switch or relay 32. In one non-limiting embodiment, controller 16 comprises a portion of a conventional engine control unit ("ECU"). In other alternate embodiments, controller 16 is externally coupled to the engine control unit. Central processing unit 28 is preferably a conventional processor including one or more microprocessors or microcontrollers which cooperatively store and perform the below-described functions and strategies.

Timer 30 is a conventional timer or timing circuit which is controlled (e.g., set and reset) by processor 28. In the preferred embodiment, electronic switch 32 is a conventional electromechanical relay. Relay 32 is operatively coupled to processor 28, voltage source 24, and fans 22. In response to signals received from processor 28, relay 32 selectively moves between an "open" position (shown in FIG. 2) and a "closed" position, effective to respectively disconnect and connect fans 22 to voltage source 24. Particularly, in the preferred embodiment of the invention, processor 28 selectively communicates "high" and "low" signals to relay 32, effective to energize and de-energize the relay coil 34 and cause the selectively positionable relay switch 36 to respectively close and open the circuit between voltage source 24 and fans 22, thereby activating and deactivating fans 22. In other alternate embodiments, switch 32 may comprise other types of selectively controllable electronic switches such as a solid state relay or switch.

Sensors 18 comprise conventional and commercially available hydrogen gas sensors which measure and/or detect the presence of hydrogen gas and which generate and communicate signals to hydrogen gas detection module 26 representing the measured levels or amounts of hydrogen gas. Sensors 18 are operatively mounted and/or disposed in areas of the vehicle 12 in which hydrogen collection or pocketing may occur. Such areas may include without limitation, areas in the vehicle passenger compartment, in the vehicle trunk, under the vehicle hood, under the vehicle body, and/or in any other portion of the vehicle or vehicle body where hydrogen gas may collect or pocket (e.g., areas in which portions of the hydrogen gas channeling system is disposed or traverses). The precise location of these areas can be determined in a conventional manner by testing the vehicle, and may often reside in "upper" regions of the vehicle or vehicle body, due to the relatively low specific gravity of hydrogen gas. Hydrogen gas detection module 26 processes the signals received from sensors 18 and selectively provides "alarm" or alert signals to controller 16 based on the signals received from sensors 18. In one non-limiting embodiment, the hydrogen gas detection module 26 forms an integrated portion of controller 16. In other alternate embodiments, module 26 provides different signals to controller 16 based upon the amount or density of the hydrogen gas detected. In one non-limiting embodiment, module 26 provides three levels of detection: "trace", "moderate" and "significant". In this embodiment, the controller 16 may be configured to ignore lower levels of detected gas (i.e., "trace" levels) and only activate the fans 22 upon the receipt of signals indicating "moderate" and/or "significant" levels of detected gas.

Sensors 20 comprise conventional and commercially available vehicle attribute sensors, which measure particular vehicle attributes and generate signals representing the measured attributes. In the preferred embodiment, sensors 20 include one or more vehicle door sensors which detect the opening of any of the doors of vehicle 12 and which respectively generate and communicate signals to controller 16 (and/or to an engine control unit) representing the detected open door. Sensors 20 further include one or more fault detection sensors which detect faults within any of sensors 18, within the electrical system of the vehicle and/or within hydrogen gas detection module 26, and one or more vehicle operating condition sensors which detect when the vehicle is being operated.

Fans 22 are conventional and commercially available ventilation fans which are effective to ventilate and/or expel gases from portions of vehicle 12. In the preferred embodiment of the invention, fans 22 are mounted in relative close proximity to sensors 18 (i.e., in portions of the vehicle in which hydrogen collection or pocketing may occur). When activated, fans 22 are effective to generate a flow of air and/or gas which expels pocketed hydrogen gas through the natural seams of the vehicle. In other alternate embodiments, vents are formed near the fans which are in fluid communication with the atmosphere outside of the vehicle and which are effective to cooperate with the fans 22 to transfer hydrogen gas outside of the vehicle when the fans 22 are activated. In one non-limiting embodiment, fans 22 are multi-speed fans, and are capable of operating at different speeds based upon the signals received from controller 16 (e.g., controller 16 causes the fans 22 to operate at faster speeds if "significant" levels of gas are detected, and at lower speeds if only "moderate" or "trace" levels of gas are detected).

Figure 3:
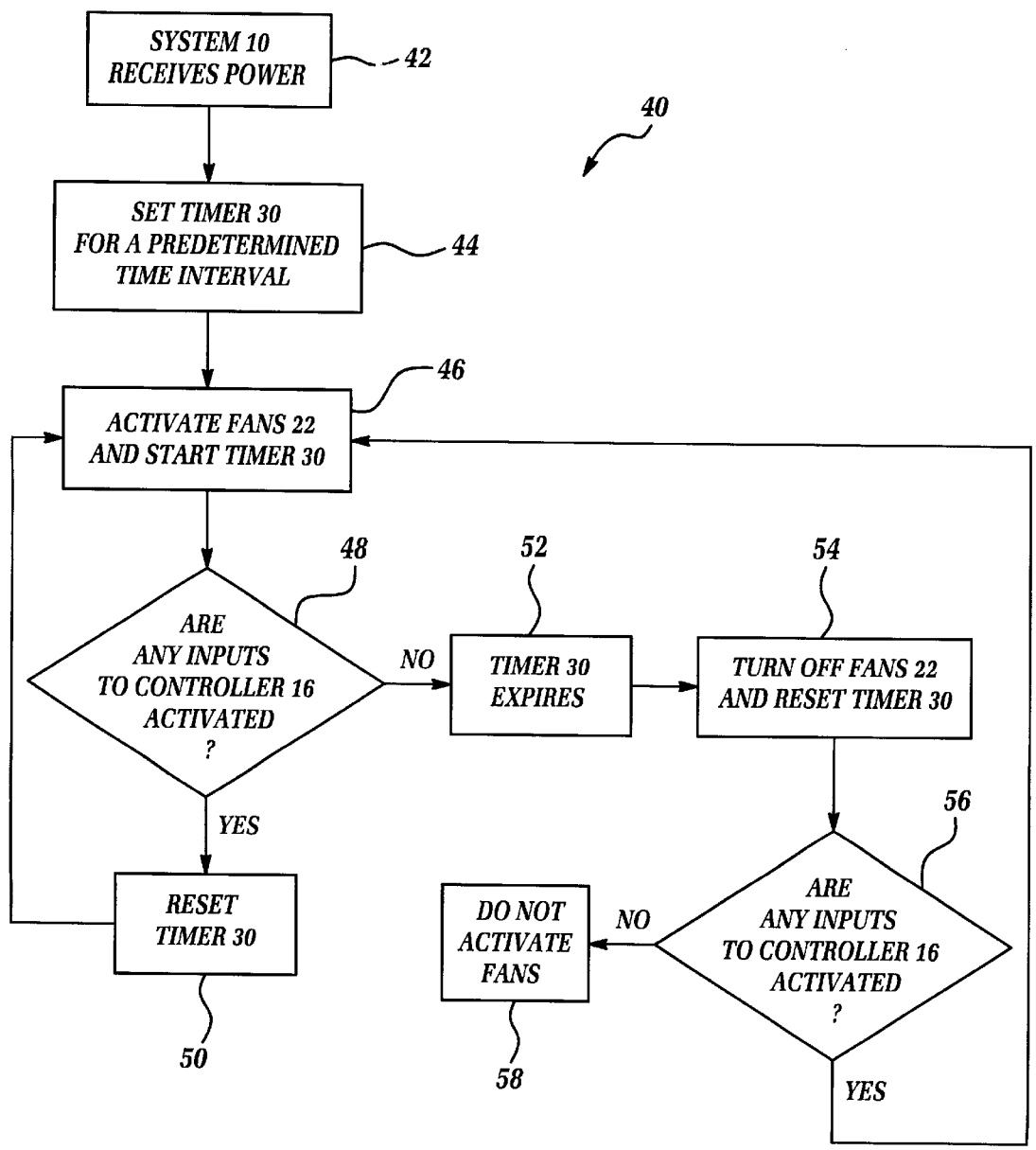
FIG. 3 is a block diagram illustrating a method used by the system shown in FIG. 1 to selectively and periodically ventilate hydrogen gas from the vehicle.

To understand the operation of system 10, reference is now made to "flow chart" or diagram 40 of FIG. 3, illustrating one non-limiting embodiment of a strategy employed by system 10 to ventilate hydrogen gas from vehicle 12. As shown, strategy 40 begins with functional block or step 42, when controller 16 receives electrical power (e.g., when vehicle 12 is "powered up" or started). Controller 16 then proceeds to functional block or step 44, where it sets timer 30 for a predetermined interval or period of time. This time period or interval is calibratable and may be based upon the specific vehicle in which system 10 is deployed, or upon the size and/or speed of fans 22. In one non-limiting embodiment, the interval of time is equal to approximately five minutes and thirty seconds. In functional block or step 46, controller 16 activates fans 22 and commences timer 30. In the preferred embodiment, processor 28 communicates a "high" signal to relay 32 (e.g., processor 28 applies an operative voltage to the relay coil 34). The signal energizes relay coil 34, effective to cause relay switch 36 to connect fans 22 to power supply 24, thereby activating fans 22.

In functional block or step 48, controller 16 monitors the input signals received from sensors 20 and hydrogen gas detection module 26. If any of the input signals becomes activated during the predetermined time interval (e.g., if a door is opened, if a fault is sensed, if a refueling condition is sensed, if vehicle 12 is being driven or operated, or if hydrogen gas is detected by any of sensors 18), controller 16 resets timer 30, as shown in step 50. Controller 16 continues to operate fans 22 and runs the reset timer 30. In this manner, timer 30 is reset whenever any input becomes active and fans 22 will continue to operate as long as any input is active.

If none of the inputs to processor 28 becomes active during the predetermined time interval, timer 30 expires, as shown by functional block or step 52, and controller 16 proceeds to functional block or step 54. Controller 16 then deactivates fans 22 (e.g., causes the signal to relay 32 to become "low", thereby causing the relay 32 to move to its original "open" position) and resets timer 30. Controller 16 continues to monitor the inputs from sensors 20 and module 26, as shown in functional block or step 56. If none of the inputs becomes active, controller 16 does not activate fans 22, as shown in functional block or step 58. Otherwise, if any input is activated, controller 16 proceeds to step 46, activates fans 22, starts timer 30, and repeats the foregoing steps. In one non-limiting embodiment, controller 16 is effective to determine which of sensors 18 have detected hydrogen gas, and activates only those fans 22 which are in relative close proximity to the sensors 18 that detected hydrogen gas.

In this manner, the system 10 is able to substantially prevent the pocketing or collection of hydrogen gas within vehicle 12. Particularly, if any hydrogen leaks or escapes into vehicle 12, sensors 18 generate signals that cause controller 16 to activate fans 22 once a detectable amount of hydrogen gas is present. Furthermore, controller 16 will also activate fans 22 whenever a vehicle door is open, thereby allowing any residual (e.g., non-detectable) amounts of hydrogen gas to be easily vented from the vehicle 12. Furthermore, the control strategy used by system 10 substantially removes any hydrogen gas from vehicle 12 before it reaches detectable levels by automatically activating fans 22 in situations which may result in hydrogen leakage, such as during vehicle refueling and/or vehicle operation, and by continually resetting timer 30 until all inputs have been deactivated for the predetermined time interval. Moreover, system 10 substantially prevents hydrogen gas from pocketing in vehicle 12 even in the presence of any faults which could adversely effect the accuracy of the hydrogen gas detection capability of system 10.

It is to be understood that the invention is not to be limited to the exact construction and/or method which has been illustrated and discussed above, but that various changes and/or modifications may be made without departing from the spirit and the scope of the invention.

What is claimed is:

1. A system for ventilating gas from a vehicle, said system comprising:
   at least one first sensor which is effective to detect said gas and to generate a first signal in response to said detection;
   a second sensor which is effective to detect when said vehicle is being refueled and to generate a second signal in response to said detection;
   at least one fan which is operatively disposed within said vehicle; and
   a controller which is communicatively coupled to said at least one first sensor and said second sensor, said controller being effective to receive said first signal and said second signal, to selectively activate said at least one fan upon receipt of said first signal, and to activate said at least one fan upon receipt of said second signal, thereby ventilating said gas from said vehicle.

2. The system of claim 1 wherein said gas comprises hydrogen gas.

3. The system of claim 1 wherein said at least one sensor comprises a sensor which is operatively mounted within a passenger compartment of said vehicle.

4. The system of claim 3 wherein said at least one sensor comprises a sensor which is operatively mounted within a trunk of said vehicle.

5. The system of claim 4 wherein said at least one sensor comprises a sensor which is operatively mounted under a hood of said vehicle.

6. The system of claim 5 wherein said at least one sensor comprises a sensor which is operatively mounted under a body portion of said vehicle.

7. A system for ventilating gas from a vehicle, said system comprising:
   at least one first sensor which is effective to detect said gas and to generate a first signal in response to said detection;
   a second sensor which is effective to detect when said vehicle is being operated and to generate a second signal in response to said detection;
   at least one fan which is operatively disposed within said vehicle; and
   a controller which is communicatively coupled to said at least one first sensor, said controller being effective to receive said first signal, to selectively activate said at least one fan upon receipt of said first signal, and to selectively activate said at least one fan for a predetermined period of time upon receipt of said second signal, thereby ventilating said gas from said vehicle.

8. A method for ventilating gas from a vehicle, said method comprising the steps of:
   providing a plurality of fans;
   operatively disposing said plurality of fans within said vehicle;
   detecting an amount of said gas within said vehicle;
   activating said plurality of fans for a first predetermined period of time in response to said detected amount of gas, thereby ventilating said gas from said vehicle;
   detecting a door of said vehicle being opened; and
   activating said plurality of fans for a second predetermined period of time in response to said detected door openings, thereby ventilating said gas from said vehicle.

9. The method of claim 8 further comprising the steps of;
   detecting a refueling of said vehicle; and
   activating said plurality of fans for a predetermined period of time in response to said detected refueling, thereby ventilating said gas from said vehicle.

10. The method of claim 9 further comprising the steps of:
    detecting operation of said vehicle; and
    activating said plurality of fans for a predetermined period of time in response to said detected operation, thereby ventilating said gas from said vehicle.

11. The method of claim 8 wherein said gas comprises hydrogen gas.

* * * * *